United States Patent

[11] 3,581,161

[72] Inventors James A. Cunningham;
Robert S. Clark, both of Dallas, Tex.

[21] Appl. No. 791,862
[22] Filed Jan. 2, 1969
[45] Patented May 25, 1971
[73] Assignee Texas Instruments Incorporated
Dallas, Tex.
Continuation of application Ser. No. 606,064, Dec. 30, 1966, now abandoned.

[54] MOLYBDENUM-GOLD-MOLYBDENUM INTERCONNECTION SYSTEM FOR INTEGRATED CIRCUITS
17 Claims, 12 Drawing Figs.

[52] U.S. Cl. .......... 317/234R, 317/235R, 317/234M
[51] Int. Cl. .......... H01l 5/02
[50] Field of Search .......... 317/234.5.3

[56] References Cited
UNITED STATES PATENTS

| | | | |
|---|---|---|---|
| 3,419,765 | 12/1968 | Clark et al. .......... | 317/234 |
| 3,290,570 | 12/1966 | Cunningham et al. .......... | 317/240 |

*Primary Examiner*—John W. Huckert
*Assistant Examiner*—Martin H. Edlow
*Attorneys*—James O. Dixon, Andrew M. Hassell, Harold Levine, Melvin Sharp, John E. Vandigriff, Henry T. Olsen and Michael A. Sileo, Jr.

ABSTRACT: There is disclosed a multilevel contact and interconnection system for integrated circuits comprising at least three levels. Ohmically connecting to the semiconductor through an opening in its insulating layer is a first layer of molybdenum. The second layer is of gold and the third of molybdenum. This system is virtually alloyless since the molybdenum does not alloy with the semiconductor material or the gold.

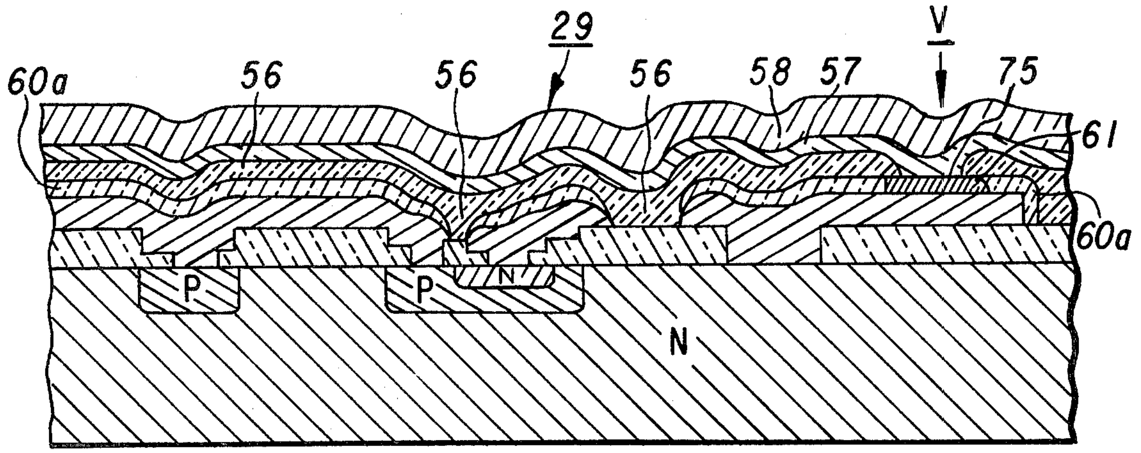

MOLYBDENUM-GOLD-MOLYBDENUM INTERCONNECTION SYSTEM FOR INTEGRATED CIRCUITS

This application is a continuation of copending application Ser. No. 606,064 filed Dec. 30, 1966 and now abandoned.

The invention relates to microelectronic devices of the semiconductor integrated circuit type, and more particularly to the provision of alternate layers of films of metal and electrical insulating material to form multilevel lead and interconnection patterns for such devices. The increased demand for microminaturization has been reflected in the field of electronics by the development of semiconductor integrated circuits or networks, whereby a plurality of active and/or passive circuit components are formed in or on a single slice of semiconductor material, each of the circuit components thereafter being interconnected in a particular manner to provide the desired circuit function. For example, an integrated circuit device of the monolithic type may have a number of transistors and resistors formed by diffusion beneath one major face of a slice or wafer of semiconductor material (a suitable one being silicon), a protective layer (usually of silicon oxide) upon the face of the wafer, and metallic films upon the oxide layer interconnecting the resistors and the various regions of the transistors in a desired pattern through apertures in this oxide. With increasing complexity of circuitry, however, and the corresponding increase in complexity of the interconnection pattern, it has become necessary to form more than one level of metallic film interconnections, with adequate electrical insulation or isolation between the various levels at the crossover points. This is particularly true when, upon a single slice of semiconductive material, a plurality of separate circuits are formed and it becomes necessary to interconnect the circuits for cooperative action to produce one unitary circuit function.

The materials of which the metal films and the electrical insulating layer or layers are formed must in themselves exhibit favorable chemical, electrical, thermal, and mechanical properties, including compatibility with one another to provide an adequate multilevel contact and interconnection system. For example, the metallic film or films of the first level should provide low resistance ohmic contact to the semiconductor material should adhere well to the protective layer of oxide upon the face of the slice or wafer, should not excessively alloy with the semiconductor material at temperatures encountered in the processing or packaging of the device so as to degrade device characteristics, and should not have a melting point below the temperature to which the device will be exposed during processing and device operation. The insulating material between levels of metal films, on the other hand, should afford adequate electrical isolation and be substantially free of pinholes to avoid the possibility of electrical shorting between levels. In addition, the entire system should be fabricated of metals and insulators or oxides which are hard, structurally strong materials that will not yield or break up during wafer or slice handling and testing; all of the materials should be physically and chemically stable when subjected to high temperatures so that none of the materials will undesirably react with one another or with the semiconductor substrate; the metals and the isolation or insulation medium should tightly adhere to one another and there should be good "interlevel" ohmic contact between the last or exposed metallic film of one level and the first film of the next level at conductive cross points.

It is therefore an object of the present invention to provide a new and improved contact and multilevel interconnection scheme for semiconductor integrated circuits. It is another object of the invention to provide a contact and multilevel interconnection scheme that possess all or substantially all of the above-mentioned characteristics. It is yet another object of the invention to provide new and improved processes for a multilevel interconnection construction for integrated circuits, particularly integrated circuits of the type including wafers or substrates of silicon semiconductor material with silicon oxide coatings thereupon.

In preferred embodiments of this invention, use is made of molybdenum and gold in combination in the interconnection system of the invention because of the many superior properties that this combination offers. While a complete description of some of these properties is discussed in copending U.S. Pat. application Ser. No. 363,197, filed Apr. 28, 1964, now issued U.S. Pat. No. 3,290,570, and assigned to the assignee of the present patent, some of the most favorable ones include the fact that molybdenum makes good electrical contact to silicon semiconductor material, particularly if the contact regions are heavily doped, but yet does not undesirably alloy with the silicon surface so as to degrade the device. Furthermore, the molybdenum adheres well to silicon oxide, can be etched in a controlled manner with an etchant not incompatible with other materials, and when used in combination with gold is virtually impervious to the gold. In this regard, it is to be noted that when molybdenum is formed in contact with the silicon semiconductor material and a gold layer overlies the molybdenum, there results a virtually "alloyless" contact system, the molybdenum not alloying with the silicon and the gold not alloying with the molybdenum. Gold, in addition to its excellent conductivity, is easily deposited by conventional evaporation techniques, lends itself nicely to photoresist etch procedures associated with defining the contact and interconnection patterns and, is easily bondable with an external gold wire.

In addition, the molybdenum-gold contact system is not subject to increasing electrical resistivity due to the interdiffusion or compound formation associated with many other metallic film combinations. For example, copper wire manufacturers go to great expense to provide ultrahigh purity copper to obtain maximum conductivity. This may be explained on the basis that any impurity atoms in even a relatively pure metal tend to scatter the moving electrons in the metal, thus increasing their resistance to current flow. This, however, is not present in the molybdenum-gold film combination because molybdenum and gold have very low mutual solubilities (so that interdiffusion is concentration limited) and also because they form no compounds with one another. Metal film combinations, however, such as chromium-gold, titanium-gold, iron-gold, nickel-gold and many others do mix and interdiffuse rapidly with one another so that there is a real absence of a "barrier" metal, and the films themselves are not metallurgically stable.

The molybdenum-gold system also offers reliability advantages in high current-density applications. It has been observed that expanded ohmic contacts for integrated circuits and discrete transistors, for example, become electrically open after prolonged operation at current densities of the order of $1\times10^6$ A/cm.$^2$ or higher, thus causing device failure. This failure mechanism is believed related to a phenomenon termed current-induced mass transport, the rate of which is approximately inversely proportional to the activation energy of self diffusion of the particular metal conductor or conductors involved. It has been observed that some metals which have low values of activation energy, aluminum for example, have a greater reliability risk associated with them than other metals which have higher values of activation energy. Gold and particularly molybdenum, on the other hand, have very high values of this activation energy of self diffusion, and thus have minimal susceptibility to current-induced mass transport problems.

The novel features believed characteristic of this invention are set forth in the appended claims. The invention itself, however, as well as other objects and advantages thereof may best be understood by reference to the following detailed description when read in conjunction with the accompanying drawings, wherein:

Figure 3:
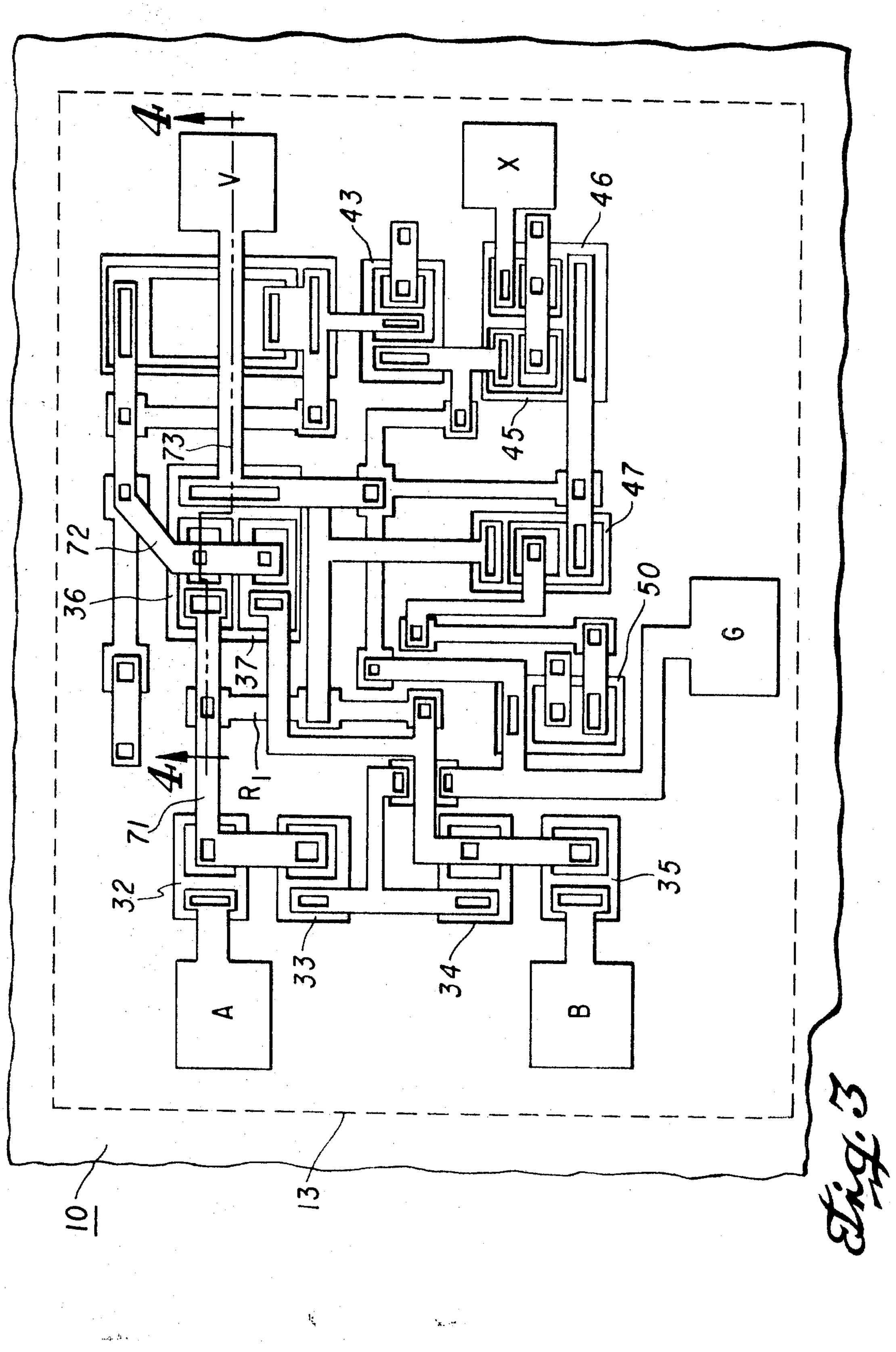
FIG. 3 is a plan view, greatly enlarged, of the layout of circuit components in one of the functional elements in the wafer of FIG. 1, these same circuit components being illustrated in schematic diagram form in FIG. 2.
Figures 4, 5, 6, 7A, 7B:
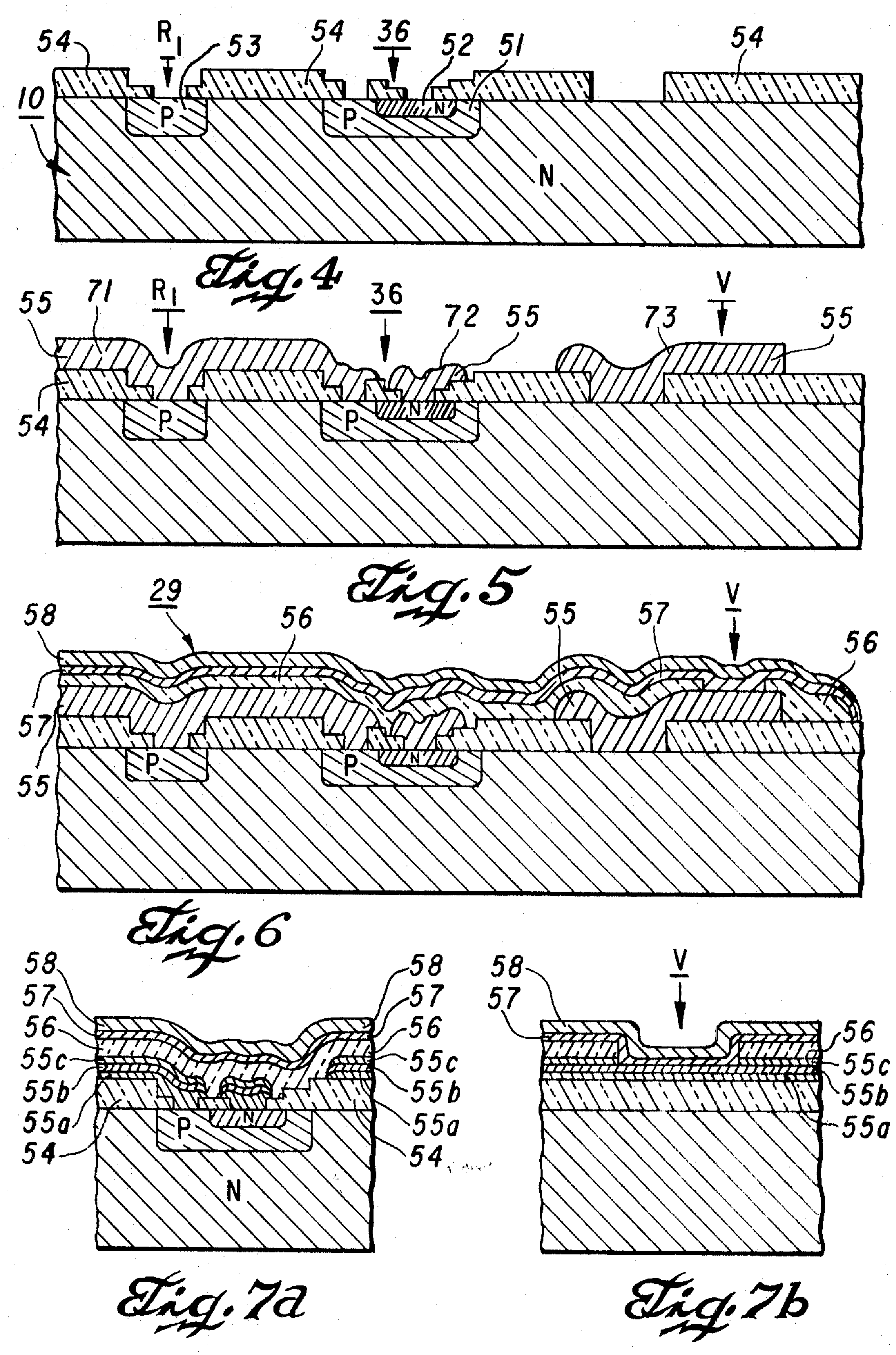

FIGS. 4—6 are sectional views of a portion of the integrated circuit structure shown in FIG. 3 taken along the section line 4—4, showing subsequent steps in the provision of the multilevel interconnection system of the present invention;

FIGS. 7*a* and 7*b* are also partial views, in section, of the same sectional portion described with respect to FIGS. 4—6, but describing an alternate embodiment of the present invention; and FIGS. 8—11 are sectional views of the portion of the wafer taken along the section line 4—4 in FIG. 3, showing subsequent steps and an alternate method of construction of a multilevel interconnection system in accordance with the invention.

All of the figures are not necessarily to scale, but in some instances have the dimensions exaggerated to emphasize particular features of the invention.

Figure 1:
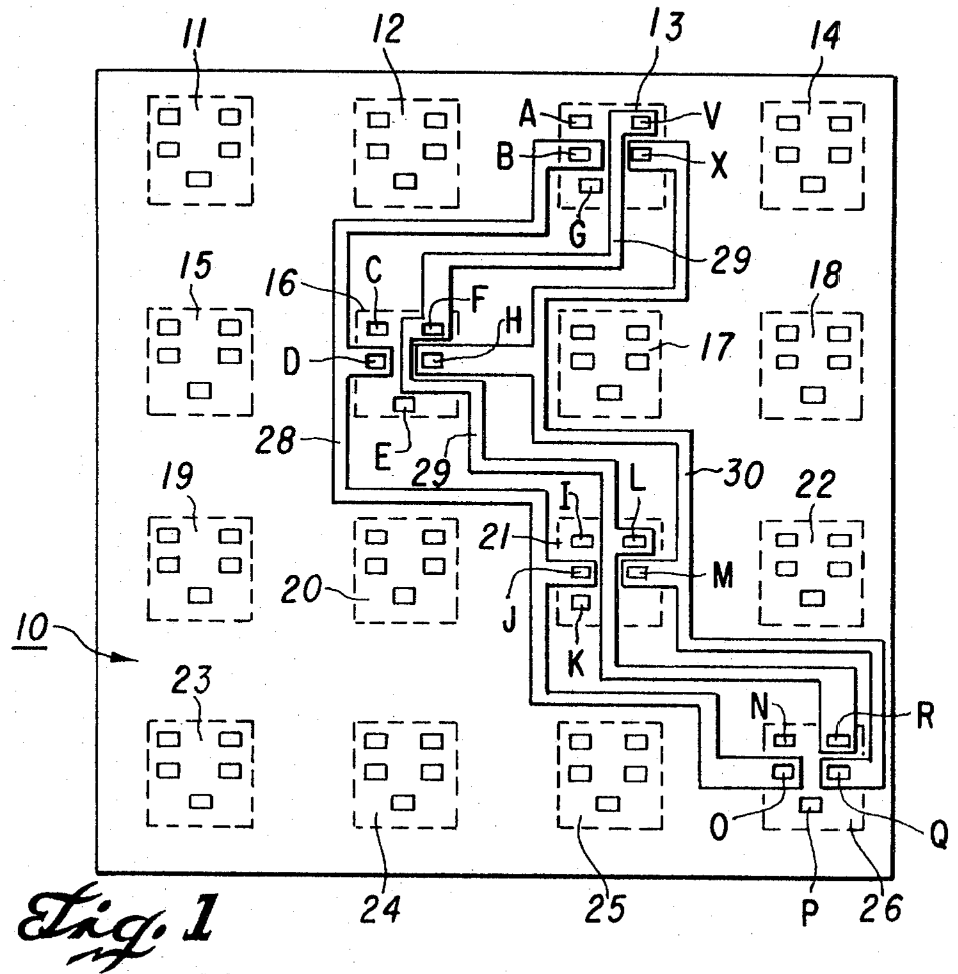
FIG. 1 is a plan view, greatly enlarged, of a semiconductor wafer or slice containing a plurality of functional elements and adapted for use in practicing this invention.
Figure 2:
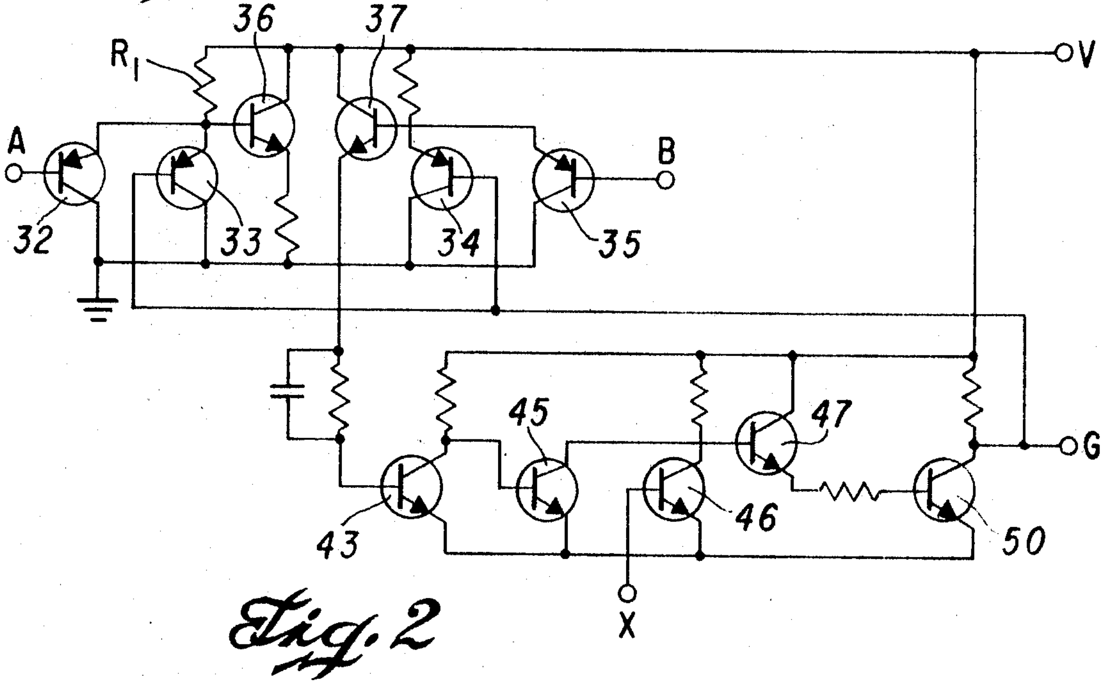
FIG. 2 is a schematic diagram of the electronic circuit in one of the functional elements shown in FIG. 1.

Referring now to the drawings, a slice or wafer substrate 10 of semiconductor material, in this case silicon semiconductor material, is illustrated in FIG. 1, having a number of functional elements therein. Although only 16 such functional elements are shown for illustration, ordinarily a much larger number is utilized. Each of the functional elements 11—26 contains the necessary number of transistors, resistors, capacitors or the like, interconnected to produce a desired electrical circuit function. For example the functional element 13 may comprise the circuit shown schematically in FIG. 2 and by plan view in FIG. 3. The circuit of this functional element 13 would then include the PNP transistors 32, 33, 34 and 35 and the NPN transistors 36, 37, 43, 45, 46, 47 and 50, the three input terminals A, B, and X and an output terminal G. These terminals, along with the voltage supply terminal V, would correspond to the five identically designated terminals on the functional element 13 in FIG. 1.

Let us assume that it is desired to appropriately interconnect the four functional elements 13, 16, 21 and 26 of the 16 functional elements 11—26 for their cooperative action to produce a unitary electrical function. As depicted in FIG. 1, therefore, the terminals B, D, J, and O of functional elements 13, 16, 21 and 26, respectively, are electrically joined by the interconnector 28; similarly, the terminals V, F, L and R are electrically joined by the interconnector 29, and the terminals X, H, M and Q are electrically joined by the interconnector 30. Recognizing that there are already a large number of first level electrical interconnections joining the various transistors with one another as well as with the other circuit components and terminals, as shown in FIG. 3, it will be appreciated that the interconnectors 28, 29 and 30 must necessarily overlie some of the first level metal interconnection pattern shown in FIG. 3. For this reason, and also because the interconnections between functional elements are preferably made in an operation separate from the one by which the interconnections within an element are formed, the interconnection pattern of FIG. 1 must necessarily be formed as a second level, separated from the first level interconnection pattern by an insulating medium.

The transistors and other circuit components may be formed within or upon the semiconductor substrate 10 by any of the techniques known in the integrated circuit art such as, for example, epitaxial growth or diffusion. Thus, looking at FIG. 4 there is depicted, in section, a portion of the integrated circuit structure of FIG. 3 before the application of any of the metal interconnectors. The NPN transistor 36 comprises an N-type collector formed by the substrate 10, the diffused P-type base region 51, and an N-type diffused emitter region 52. The resistor $R_1$ is provided by the P-type diffused region 53, formed simultaneously with the base region 51 of the transistor. An oxide coating 54 on the top surface of the substrate acquires a stepped configuration, as shown, due to the successive diffusion operations. Thereafter apertures or holes are cut in the oxide coating 54 where the first level interconnection ohmic contacts are to be made.

As the next step, a thin metal film 55 of 20,000 angstroms, for example, formed of molybdenum, one of the better electrical conductors, (see FIG. 5) is deposited upon the surface of the oxide layer 54 and in ohmic contact with the semiconductor material within the apertures or holes in the oxide layer. Various techniques may be utilized for the deposition of the molybdenum film 55, for example sputtering, evaporation, or sublimation; one evaporation technique being described more particularly in the above-mentioned copending U.S. Pat. application, Ser. No. 363,197. Using conventional photographic masking and etching techniques known in the industry, selected portions of the molybdenum film 55 are removed to provide the first level pattern of ohmic contacts and interconnections, the interconnector 71 ohmically connecting the base of the transistor 36 to one end of the resistor $R_1$, the interconnector 72 making ohmic contact to the transistor 36 emitter; while the interconnector 73 ohmically connects the collector of the transistor 36 to the supply terminal V, as illustrated in FIG. 5.

A layer 56 of insulating medium is then deposited by any suitable technique, for example evaporation, sputtering or electron beam deposition, over the molybdenum film 55, and then selectively etched to expose the surface of the molybdenum film solely at the terminal point V, as depicted in FIG. 6. The purpose of the insulating layer 56 is to electrically isolate the metal of the first level interconnectors from the metal of the second level interconnectors which are to be subsequently deposited. Accordingly, the layer 56 may be formed of inorganic materials such as silicon nitride, aluminum oxide, tantalum oxide, or various organic insulating materials. In this particular example the insulating layer 56 is silicon dioxide, deposited by RF sputtering to a thickness of 10,000 angstroms. The layer is then selectively removed to expose the top surface of the molybdenum film 55 at the bonding pad V.

Another molybdenum film 57 is now deposited upon the insulating oxide layer 56 to a thickness of, say, 1200 angstroms, followed by the deposition by evaporation, for example, of a gold film 58, formed to a thickness of approximately 7500 angstroms, for example. The metal films 57 and 58 are then selectively etched to provide the pattern for the second level interconnector 29, the interlevel contact being provided at the bonding pad V between the molybdenum films 57 and 55, respectively. The top layer 58, being of gold, has an extremely high conductivity and adheres well to the molybdenum film 57. An external bonding wire of gold, for example, may then be bonded by thermocompression to the gold film 58. Among the advantages of this system, as illustrated in FIG. 6, is the extremely good adherence of the molybdenum layers or films 55 and 57 to the insulating layer 56. If a three, four, or a higher level contact and interconnection system is desired, each of the levels besides the final one could be of a pure molybdenum film with the final level being a molybdenum-gold combination, the overlying layer of gold facilitating bonding with an external wire.

Prior to the deposition of the molybdenum film 57, it may be desirable to carry out a careful predeposition cleanup, for example by sputter-cleaning, of the surface of the insulating film 56 and the exposed surface of the molybdenum film 55. This cleaning minimizes or eliminates any surface oxides that may have formed upon the exposed surface of the molybdenum film 55, thus insuring good interlevel ohmic contact between the molybdenum films 55, 57, as well as the adherence of the molybdenum film 57 to the insulating film 56.

As another embodiment of the present invention, the single layer of molybdenum of the first level patterns 71, 72 and 73 may be replaced by a three layer sandwich structure indicated in FIGS. 7*a* and 7*b*. Such a structure comprises a first thin film **55*a* of molybdenum formed to a thickness of 1200 angstroms, ohmically engaging the semiconductor material 10, and overlying the protective oxide layer 54, a second thin film 55*b* of a gold deposited to a thickness of 7500 angstroms, and a third layer 55*c* of molybdenum deposited to a thickness of 1000 angstroms. The final level of metallization overlying the insulating medium then comprises the films 57 and 58 of molybdenum and gold, respectively, as previously described with respect to FIG. 6. The insulating layer 56 and the molybdenum layer 55c are selectively etched at the bonding pad V to allow the molybdenum layer 57 to make direct ohmic contact to the gold film 55b. By utilizing an echant that selectively etches molybdenum but substantially unaffects gold, for example one comprised of 70 parts phosphoric acid, 15 parts acetic acid, 3 parts nitric acid, and 5 parts de-ionized water, it is possible to carefully control this selective removal step at the bonding pad V so that the gold layer 55b is not etched all the way through. In addition, a color change accompanies this etching operation (from a silver color to a gold color) and provides a convenient visual control over the etching operation. The molybdenum films 55c and 57 tightly adhere to the insulating layer 56 and increases the interfilm adhesion of the entire multilevel interconnection system. The replacement of the single film 55 of molybdenum by the trimetal sandwich structure molybdenum-gold-molybdenum has the additional advantages of increasing the first level interconnection electrical conductivity due to the addition of the highly conductive gold film 55b and of decreasing the interlevel electrical contact resistance between the first and second level due to the direct ohmic contact between the molybdenum film 57 of the second level interconnector and the exposed surface portion of the gold film 55b** of the first level.

Figure 8:
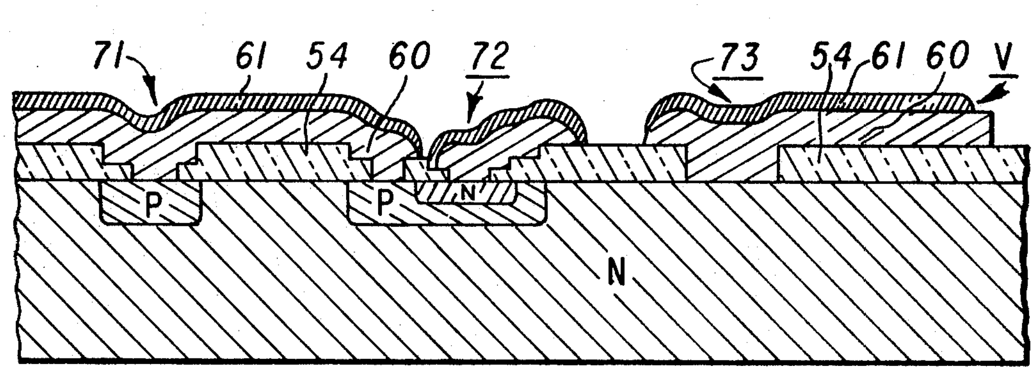
Figure 9:
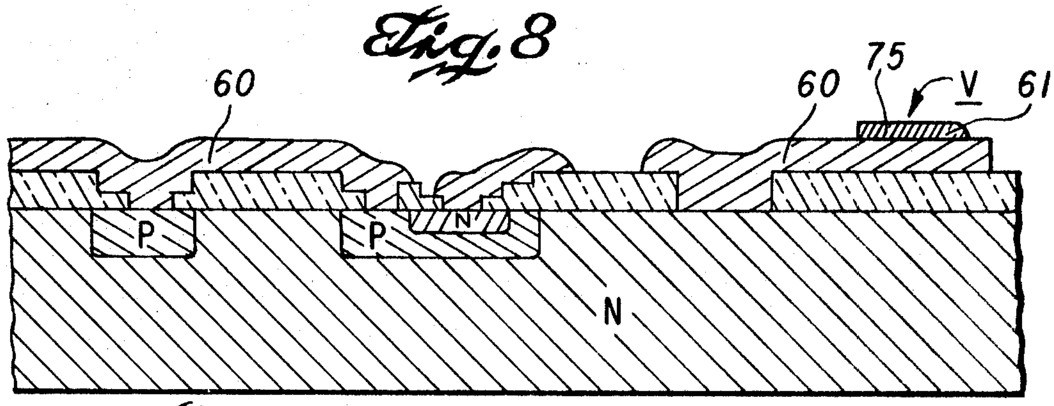

Another embodiment of the present invention is illustrated in FIGS. 8—11 and described below. A pair of thin metal films 60 and 61 of molybdenum and gold, respectively, are deposited as before and selectively etched to provide the first level interconnection pattern including the interconnectors 71, 72 and 73 as illustrated in FIG. 8. The molybdenum layer 60 should desirably be deposited to a thickness of from 10,000 to 30,000 angstroms, followed by a thinner (approximately 1,000 angstroms) film of gold 61. The gold film is then selectively etched, for example, to remove all the gold film except a surface area portion 75, as shown in FIG. 9 providing the bonding pad terminal V, the area where the second level of metallic interconnections are to make contact to the first level. The selective removal of the gold film 61 is accomplished by applying an etchant, for example a cyanide solution, which selectively removes gold, but substantially unaffects the underlying molybdenum film.

A very thin insulating skin 60a of molybdenum oxide $MoO_3$) is then genetically formed from and adjacent to the molybdenum film 60. This may be accomplished by placing the entire assembly in an oxygen atmosphere for about 10 minutes at approximately 400° C. to thermally oxidize the surface of the molybdenum film 60, thus forming a molybdenum oxide insulating skin a few thousand angstroms thick. The gold region or area 75 is substantially unaffected by this thermal oxidation operation, and provides an oxidation mask for the portion of the molybdenum film 60 underlying the area 75. The resulting structure is shown in FIG. 10 wherein the unoxidized portion of the molybdenum film 60 is illustrated as providing the ohmic interconnectors of the first level, an oxide or insulating skin overlying this molybdenum film except for a thin film of gold 61 which overlies the unoxidized portion of the molybdenum film 60 at the interlevel bonding terminal pad V.

Figures 10, 11:
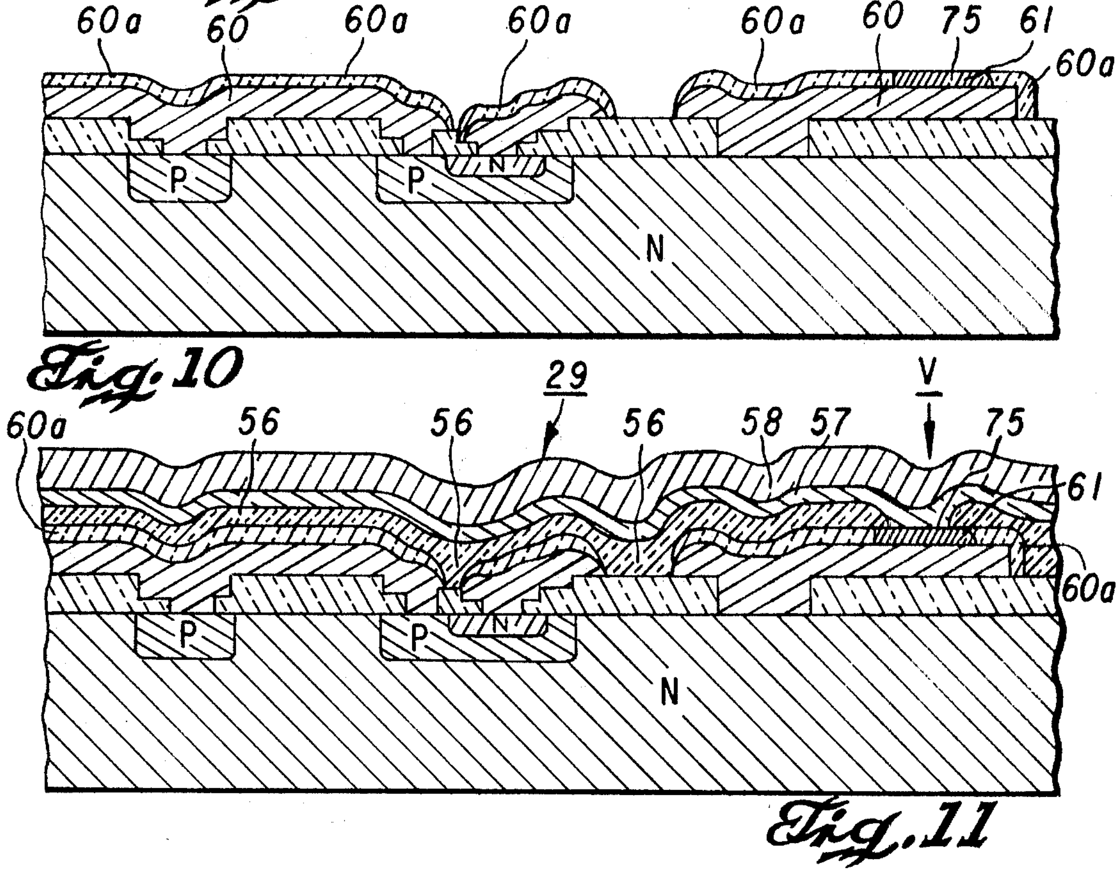

A layer 56 of insulating material, for example silicon dioxide, is then deposited to a thickness of from 10,000 to 20,000 angstroms, for example, upon the entire face of the assembly shown in FIG. 10, this layer then being selectively etched to expose the surface of the gold film position 75, and films 57 and 58 of molybdenum and gold are then deposited as before and selectively etched to provide the second or final level interconnector 29.

The resulting structure is shown in FIG. 11. It provides the additional advantage of two distinctly different insulating layers or oxides 60a and 56 sandwiched together to avoid any congruent pinholes, thereby increasing the electrical isolation between the levels of interconnectors. These isolating films 60a and 56 may be composed of two different materials and formed by different physical or chemical processes. In addition, it is to be particularly noted that the oxidation of the molybdenum layer of film 60 provides isolation or insulation not only at the top of this layer but also around the edges of the film, thereby additionally increasing the electrical isolation. While this embodiment contemplates the use of molybdenum and gold as the metal films due to their superior characteristics, and the advantages obtained as discussed above, other combinations of metals may be utilized when practicing the described method, noting that the metallic layer 60 could be formed of an oxidizable metal such as titanium, tantalum, rhodium, cobalt, nickel or even aluminum, if desired, while the overlying layer 61 should be of an oxide resistant metal, gold being a very desirable one due to its excellent conductivity.

The advantages of a double oxide or insulating layer between multilevels, as previously described with reference to FIG. 11, may also be obtained by oxidizing a surface portion of the molybdenum films 55c illustrated in the drawing of FIGS. 7a and 7b prior to the deposition of the insulating layer 56. The final structure would then be as shown in FIGS. 7a and 7bbut there would be additionally a genetically formed molybdenum oxide film overlying the top molybdenum film 55c of the molybdenum-gold-molybdenum multilayer films of the first level. The top or final contact or level could then be formed by etching through the insulating layer 56, the molybdenum oxide film, and the molybdenum film 55c to expose the surface of the gold film 55b at the bonding pad V, and then depositing the next level of molybdenum film 57 and gold film 58, for example.

Various modifications of the above described embodiments and processes may be utilized in accordance with the invention. For example, it may be desirable to perform very shallow diffusions of impurities at the points of contact between the molybdenum film (films) and the semiconductor surface to provide low resistivity ohmic contacts at these points. In addition, instead of depositing the molybdenum film directly upon the semiconductor surface, regions or zones of metallic material may be deposited intermediate the silicon surface and the molybdenum film. These metallic regions may be, for example, platinum-silicide deposits formed in the contact areas prior to the deposition of the molybdenum film, or a flash or very thin layer of aluminum applied prior to the deposition of the molybdenum film. Further, it is to be understood that throughout the above description the use of the metals molybdenum and gold are to include not only pure molybdenum and gold layers, but also molybdenum and gold layers that may have a minor percentage of impurities added thereto. For example, trace impurities may be added to the molybdenum film to increase its adherence and the gold films may have a minor percentage of platinum added thereto to increase the adhesion of the gold to the molybdenum.

While the embodiments and processes of the present invention have been directed toward monolithic integrated circuits and the application of multilevel interconnections to these monolithic integrated circuits, the processes and structures described above may have other applications such as in the areas of discrete components, hybrid integrated circuits, or during the fabrication of thin film capacitors, whenever it is desired to provide alternating layers or films of metal and electrical insulating material. Various other modifications of the disclosed processes and embodiments will become apparent to persons skilled in the art without departing from the spirit and scope of the invention as defined by the appended claims.

What I claim is:

1. An ohmic contact and electrical interconnection arrangement for a semiconductor integrated circuit of the type having a plurality of circuit components formed by semiconductor regions extending to one face of a body of semiconductor material, a protective coating of insulating material upon said one face, each region including at least one PN junction extending to the said one face beneath said protective coating, said arrangement comprising a first film essentially of molybdenum ohmically engaging and electrically interconnecting select ones of said regions through apertures in said protective coating, a second film essentially of gold overlying said first film, and a third film essentially of molybdenum overlying said second film.

2. An integrated circuit semiconductor device, comprising:

a. a body of semiconductor material, b. a plurality of circuit components within said body formed by overlying regions of opposite conductivity type with PN junctions intermediate said regions extending to a major surface of said body, c. a protective coating of insulating material upon said major surface, d. a plurality of first level interconnectors ohmically engaging and electrically interconnecting select ones of said regions through openings in said protective coating, at least one of said first level interconnectors extending out over said protective coating to a given position spaced from said PN junctions, said first level interconnector comprising a first thin film essentially of molybdenum, a second thin film essentially of gold overlying said first thin film, and a third thin film essentially of molybdenum overlying said second thin film, e. a second level interconnector ohmically connected with said at least one first level interconnector at said given position, and f. a layer of insulating medium electrically isolating said first and second level interconnectors from one another except at said given position.

3. The device as described in claim 2 wherein a portion of said third thin film is removed and a corresponding portion of said second thin film is exposed at said given position, and wherein said second level interconnector comprises a first film essentially of molybdenum in direct contact with said layer of insulating medium and said corresponding portion, and another film essentially of gold overlying said first film of said second level interconnector.

4. The device as described in claim 3 wherein said protective coating and said layer of insulating medium is of an oxide of silicon and said body is of silicon semiconductor material.

5. An integrated circuit semiconductor device, comprising:

a. a body of silicon semiconductor material, b. a plurality of circuit components within said body formed by overlying regions of opposite conductivity type with PN junctions intermediate said regions extending to a major surface of said body, c. a protective coating of insulating material upon said major surface, d. a plurality of first level interconnectors ohmically engaging and electrically interconnecting select ones of said regions through openings in said protective coating, at least one of said first level interconnectors extending out over said protective coating to a given position spaced from said PN junctions, said first level interconnector comprising a first thin film essentially of molybdenum, a second thin film essentially of gold overlying said first thin film, and a third thin film essentially of molybdenum overlying said second thin film, e. a second level interconnector ohmically connected with said at least one first level interconnector at said given position, f. a layer of insulating medium electrically isolating said first and second level interconnectors from one another except at said given position, and g. a genetically formed molybdenum oxide film intermediate said third thin film and said layer of insulating medium.

6. The device as described in claim 5 wherein a portion of said third thin film and said genetically formed film is removed and a corresponding portion of said second thin film is exposed at said given position, and wherein said second level interconnector comprises a first film essentially of molybdenum in direct contact with said layer of insulating medium and said corresponding portion, and another film essentially of gold overlying said first film of said second level interconnector.

7. A contact and interconnection arrangement for a semiconductor network of the type having a plurality of circuit components formed within a body of silicon semiconductor material having a protective coating upon one face of said body, and at least a first and second level of ohmic interconnections electrically interconnecting select regions of select ones of said circuit components, said first level of interconnections comprising a first layer of molybdenum ohmically engaging the surface of said select regions within openings in said protective coating, a second layer of gold overlying said first layer, and a third layer of molybdenum overlying said second layer except for an exposed portion of said second layer on one of said first level, said second level of interconnection comprising a first film of molybdenum and a second film of gold overlying said first film, and a silicon dioxide layer intermediate said first and second level of interconnections, at least one of said first level of interconnections connected with at least one of said second level of interconnections within an aperture in said silicon dioxide layer, said first film of molybdenum directly contacting said exposed portion of said second layer of gold within said aperture.

8. The assembly as described in claim 7 including another metallic region intermediate the surface of said select regions and said first layer of molybdenum.

9. The assembly as described in claim 8 wherein said another metallic region is aluminum.

10. The assembly as described in claim 8 wherein said another metallic region is platinum silicide.

11. A contact and interconnection arrangement for a semiconductor network of the type having a plurality of circuit components formed within a body of semiconductor material and at least a first and second level of interconnections ohmically interconnecting select regions of certain of said circuit components, said first level of interconnection composed of a layer essentially of molybdenum, said second level of interconnection comprising a first layer essentially of molybdenum, and a second layer essentially of gold overlying said first layer, a layer of an oxide of silicon intermediate said first and second level interconnections, a portion of said first layer extending over and in direct contact with said layer of an oxide of silicon to contact at least one of said first level interconnections through an aperture in said layer of oxide.

12. A contact and interconnection arrangement for a semiconductor network of the type having a plurality of circuit components formed within a body of silicon semiconductor material by regions of alternating conductivity type with PN junctions intermediate said regions extending to one surface of said body, and a protective coating of an oxide of said silicon semiconductor material upon said one surface, said arrangement comprising:

a. thin films of molybdenum overlying said protective coating and ohmically engaging the surfaces of select ones of said regions through apertures in said protective coating, b. films of genetically formed molybdenum oxide overlying said thin films of molybdenum except for a select portion of at least one of said thin films of molybdenum, c. an electrical insulating layer overlying said genetically formed films, d. another thin film of molybdenum overlying and in direct contact with said electrical insulating layer, said another thin film ohmically connected with said select portion of said at least one thin film of molybdenum through an aperture in said electrical insulating layer, and e. a thin film comprised of gold overlying said another thin film of molybdenum.

13. The arrangement as described in claim 12 including another gold portion overlying said first mentioned molybdenum films solely at said select portion, and said another thin film of molybdenum directly contacts said another gold portion.

14. The arrangement as described in claim 13 wherein said electrical insulating layer is silicon dioxide.

15. An ohmic contact and electrical connection arrangement for a semiconductor device comprising a semiconductor region extending to one face of a body of material, a protective coating of insulating material upon said one face, said coating having at least one opening therein exposing a portion of said semiconductor region, a first film comprised of molybdenum ohmically connecting to said portion of said semiconductor region through said at least one opening and extending over said protective coating, a second film comprised of gold overlying said first film and a third film comprised of molybdenum overlying said second film.

16. The ohmic contact and electrical connection arrangement according to claim 15 including another protective coating of insulating material upon said films having an at least one opening therein for providing an electrical connection to said underlying films.

17. The ohmic contact and electrical connection arrangement according to claim 16 including an electrical connection directly to said second film through said at least one opening in said another protective coating.